Sept. 22, 1964 I. STROWSKI 3,149,397
MANUFACTURE OF ELECTRICAL CONDENSER COILS
Filed July 18, 1961 6 Sheets-Sheet 1

ISTVÁN STROWSKI
*INVENTOR.*

BY

AGENT

Sept. 22, 1964  I. STROWSKI  3,149,397
MANUFACTURE OF ELECTRICAL CONDENSER COILS
Filed July 18, 1961  6 Sheets-Sheet 5

ISTVAN STROWSKI
*INVENTOR.*

BY

AGENT

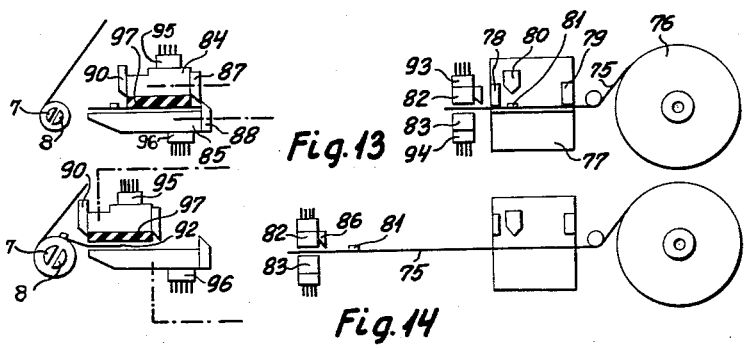
Fig. 13
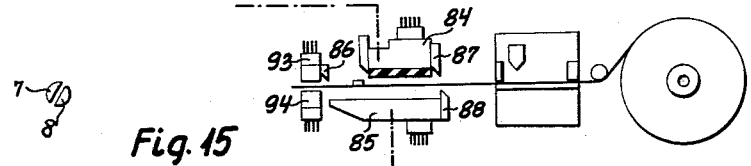
Fig. 14
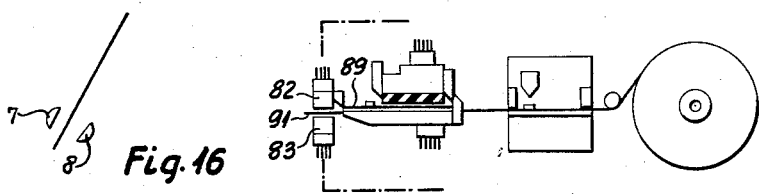
Fig. 15
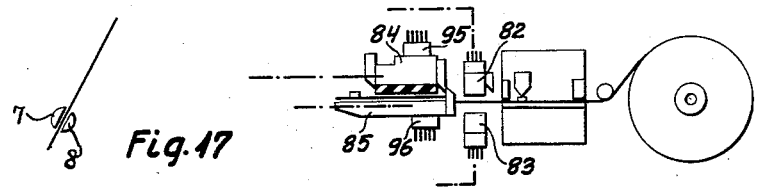
Fig. 16
Fig. 17
ISTVAN STROWSKI
*INVENTOR.*
BY
AGENT

United States Patent Office 3,149,397
Patented Sept. 22, 1964

3,149,397
MANUFACTURE OF ELECTRICAL CONDENSER COILS

István Strowski, Budapest, Hungary, assignor to Technoimpex Magyar Gepipari Kulkereskedelmi Vallalat, Budapest, Hungary
Filed July 18, 1961, Ser. No. 126,832
8 Claims. (Cl. 29—25.42)

The present invention concerns an improved method for the manufacture of condensers or capacitors and, more specifically, for the manufacture of so-called "paper" condensers.

Condensers of the type mentioned above generally consist of strips or ribbons of a suitable dielectric, e.g. paper, interleaved with aluminum strips, all of these strips being coiled during the manufacturing process about a removable mandrel or a permanent core. It is known to wind these condensers by hand or on semi-automatic machines requiring the constant attendance and supervision of an operator. However, with the rapidly increasing demand for components of this type such manufacturing methods will very soon be no longer practicable or, indeed, economically feasible. It has, therefore, become imperative to devise a fully automatic manufacturing method requiring only occasional checks by an attendant.

To be capable of truly automatic operation, such a method must take into account three basic problems:
(1) Securing the strips to the core or mandrel,
(2) Providing for different strip lengths, and
(3) Enabling automatic operation even with extremely short strips.

Condensers of the "paper" type are usually produced by drawing off lengths of a thin dielectric material from supply rolls while simultaneously doing the same with the conductive metal foils serving as anode and cathode. When the winding of the various strips about their common core is nearly completed and the strips are cut, the free ends of the metal foils must be terminated short of those of the paper or other dielectric strips so as to be overlapped by the latter as a safeguard against short-circuiting. Present methods for accomplishing this require the operator to perform the cutting. Likewise, securing the ends of the strips to the winding mandrel or, warranted, the core prior to the winding operation is the responsibility of the operator under present practice.

Finally, in the case of condensers having low rated values, it is difficult to provide for machine production of any kind because of the short foil-lengths involved which cannot normally be guided through the working stations of a machine. Such units are, therefore, generally made by hand.

It is obvious that the operations described in the foregoing are neither economical nor very accurate or speedy.

It is accordingly the principal object of the present invention to provide a method eliminating the above-enumerated disadvantages and capable of continuously automatically producing condensers of the type using a plurality of conductive and nonconductive spirally wound foils.

The above objects and further features and advantages of the present invention will be more readily apparent from the following description, reference being made to the accompanying drawing in which:

FIGS. 13–17 are diagrammatic side-elevational views illustrating successive steps in the operation of another device for carrying out the method of the present invention.

Figure 1:
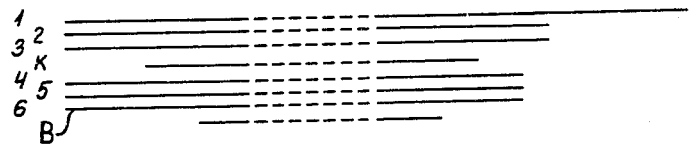
FIG. 1 is a diagrammatic edge view showing a stack of condenser layers aligned at one end in accordance with one aspect of the present invention.

FIGURE 1 shows the superimposed individual layers of the condenser in a spread-apart condition. The inner armature B (the anode) is the shortest; its surface area determines the capacity of the condenser. The outer armature K is longer and serves as the cathode. The insulating layers 1 to 6 interposed between anode and cathode are always longer than both to prevent shortening at the longitudinally spaced edges. The ends of all the insulating layers in the interior of the coil are the same distance from the end of the cathode foil K, the outer free ends, however, are staggered. Foil 1 is the longest; as outer free end serves for adhesive attachment to the outside of the finished coil. The lengths of foils 2, 3 are identical, but different from those of foils 4, 5, 6 which also are equal. The significance of the different lengths is to be seen in the fact that their staggering prevents the formation of a bulge in the surface of the coil upon gluing together the haphazardly overlapping foil ends.

The method of production comprises four stages as shown in FIGURES 5, 6, 7 and 8.

In the first stage (FIG. 5) the ends of the insulating foils (dielectric ribbons) 1 to 6 and the cathode (conductive ribbon) foil K are clamped between two half mandrels 7, 8. After clamping one or two turns must be wound about the mandrels to ensure a secure grip of the foils. The foils 1, 2, 3 and 4, 5, 6 then fan out from the two guide rollers 9, 10, and the guide rollers 13, 14, 15, 16 carried on the arm 12 pivotally mounted at 11 are introduced between the foils.

Figure 6:
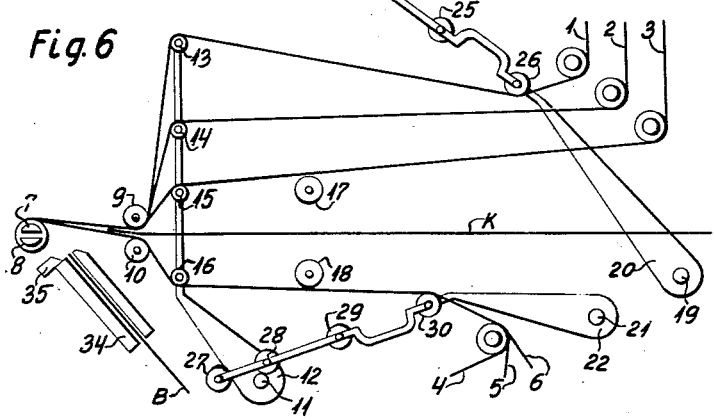

In the second stage the arm 12 rotates so that the strips take up the position shown in FIGURE 6. Guide rollers 17 and 18 are introduced between strip 3 and cathode K and between the latter and the assembly of strips 4, 5, 6.

Figure 7:
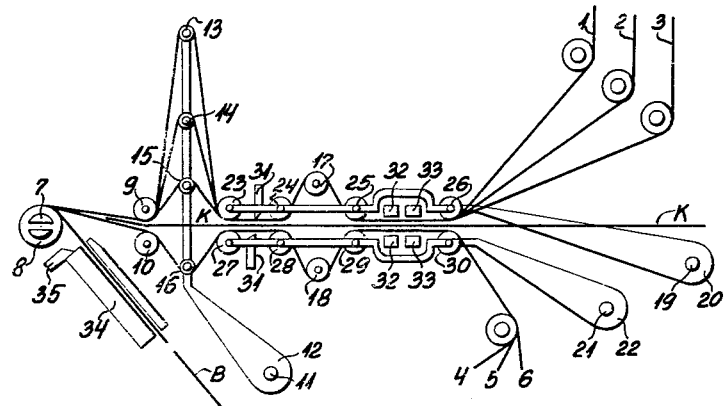

In the third stage arms 20 and 22 rotate about their respective pivot points 19 and 21 into the position shown in FIGURE 7 and as a result the strips pass between the series of guide rollers 23 to 30 inclusive.

The bundle or stock of foils so assembled is gripped by the cutters 31 and the two pairs of clamping jaws 32, 33. With the strips now being forced to travel paths of differing lengths from the supply rolls to the cutters 31, this completes the lengths adjustment and the winding begins. After 4 or 5 rotations the device 34 introduces the anode foil B into the coil. The further progress of the coil winding is controlled by electronic means.

In the vicinity of the required value, the winding is reduced to a very slow speed and on reaching that value, i.e. when the capacity is 100% of that required, the foil B is severed by cutter 35 and all others by cutters 31. At the same time the ends of the foil assembly remaining behind the cutters are gripped by the clamping jaws 32, 33 and held in readiness preparatory to being advanced for the next operation.

Thereafter the remaining free lengths of the foil K and the various dielectric foils extending back to the cutters 31, are wound up about the already existing coil obviously, the remaining lengths differ as a result of the varied paths they were made to travel around the respective guide rollers 13 to 16 prior to being severed.

Figure 5:
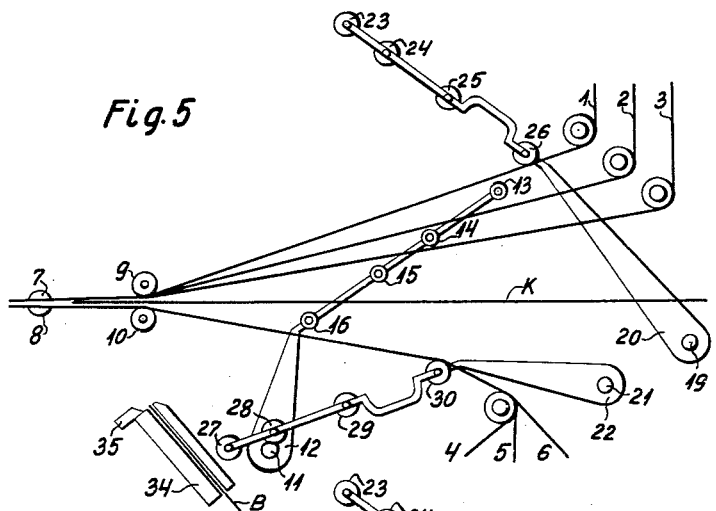
FIGS. 5–8 are side-elevational views diagrammatically illustrating an apparatus, in successive positions, for winding condensers and having laterally insertable loop-forming means.
Figure 8:
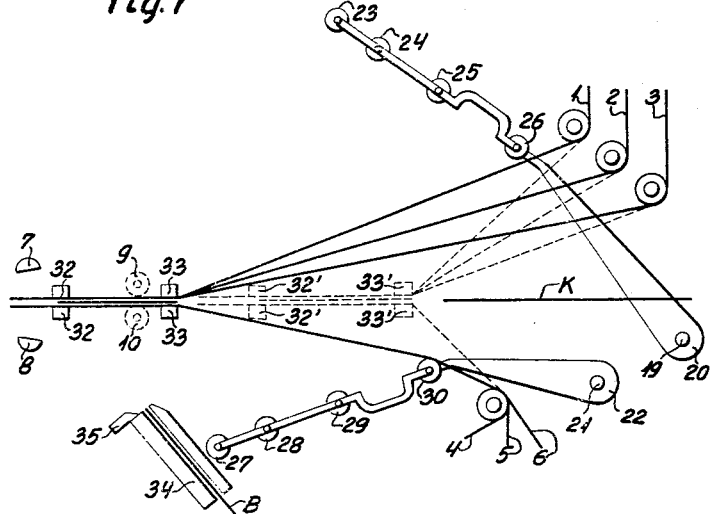
Figure 9:
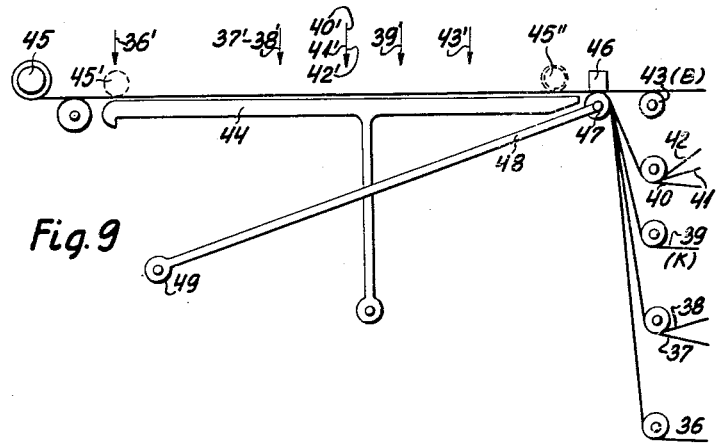
FIGS. 9–12 are views similar to FIGS. 5–8 showing successive stages of operation of another apparatus in accordance with the present invention.
Figure 10:
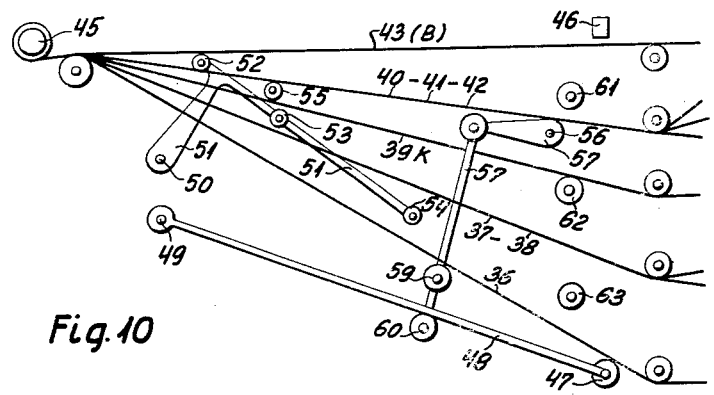
Figure 11:
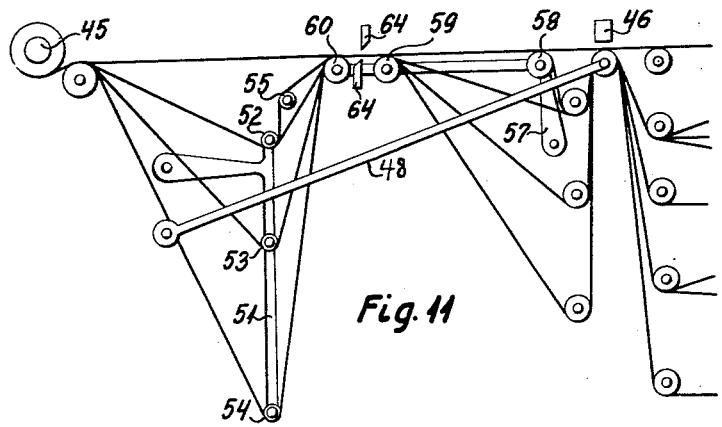
Figure 12:
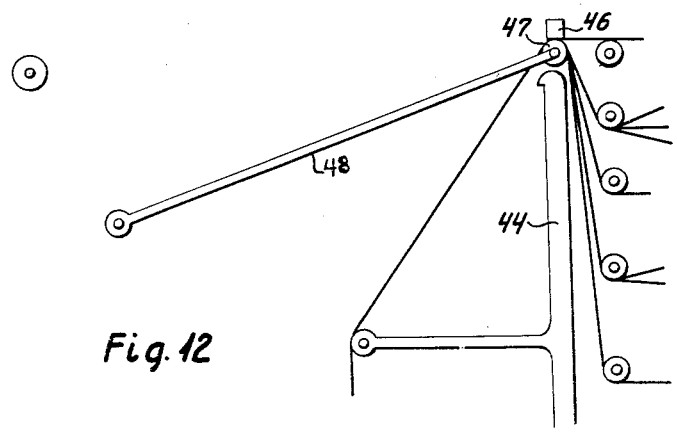

In the meantime the carrier arms 20, 22 return to the previous positions shown in FIGURES 8, 5 and 6 and the guide rollers 13, 14, 15, 16 mounted on carrier arm 12 are withdrawn from the path of the strips.

Since the pair of clamping jaws 33 engages the assembly securely against displacement the loosely gripping jaws 32 can smooth out the loops formed earlier by the rollers 24, 17, 25 and 28, 18, 29 as a result of their movement to the left as indicated by dotted lines 32', 33' in FIG. 8. These smoothed out strips form the insulating covering surrounding the cathode foil at the start of the next coil.

After completion of the winding the coil is automatically provided with a label and coated with an adhesive. The finished condenser drops out of the machine upon axial separation of the two mandrel halves. The two halves are moved sufficiently apart to enable the jaws 32 to move towards the left and introduce the end of the new strip assembly between them as indicated in FIGURE 8 in full lines. Upon reclosing the half mandrels grip the ends of the strips between them. The strips still held by clamping jaws 32 and 33 are now engaged by the rollers 9, 10; the jaws 32, 33 are released and withdrawn from the path of the strips to prevent the latter to take up their fan like arrangement and the entire operation is repeated.

It will be noted that any desired number of rollers can be mounted on carrier arm 12, and that therefore a like number of strip of different lengths can be accommodated. Likewise each of these rollers, the one for foil 1 being excepted, may guide more than one foil thereon as is indeed the case with the foils 4, 5, 6.

Another embodiment is shown in FIGURES 9, 10, 11 and 12.

Figure 2:
FIG. 2 is a view similar to FIG. 1 wherein the corresponding ends of the superposed layers are in longitudinally staggered arrangement.

The condenser in this case consists of six insulating foils 36, 37, 38, 40, 41, and 42 and of armature strips 39 and 43 constituting the cathode and anode, respectively. The arrangement of the layers is shown in FIGURE 2. The strips 37, 38 and 40, 41, 42 are collected into assemblies, whilst the remainder travel individually. The lengths of all the foil strips or assemblies of strips is different, i.e. they are staggered at both ends. In this case only one cutter is necessary.

In the first stage (FIGURE 9) the ends of the strips are spread out on a tiltable table 44. The arrows 36' to 43' inclusive indicate the positions of the ends of the different strips. The strips are gripped against guide roller 47 by a jaw 46. The core body 45, previously coated with adhesive is automatically delivered into the apparatus, first contacting the end of the longest foil 36 at 45', and thereafter rolling along the said foil like a rolling pin. As a result of the adhesive coating given the core, the longest foil 36 first adheres to the periphery of the core and thereafter the other strips are attached in a similar manner. The rolling continues until all the foils are attached to the body by at least one turn thereabout (45"). The jaw 46 is then released and the core body 45 which is restrained from rotating in the reverse direction, returns to the winding position, drawing the complete assembly of foils with it. The engagement of the strips is thus complete and winding can commence.

In the second stage (FIG. 10) the table moves out of the path of the strips and an arm 48 carrying guide roller 47 pivots about its centre 49 causing the strips to take up their fan-like position. There are then inserted between the strips the guide rollers 52, 53, 54 and 58, 59, 60 carried respectively on arms 50 and 56 which are pivotable about points 51 and 57, as well as further guide rollers 55, 61, 62, 63 which, however, have freedom of axial movement only.

In the third stage (FIG. 11) the guide roller assembly sets the various lengths as described before with reference to the first example. Cutter 64 moves into position adjacent the assembly of strips. The further progress of the winding, the fixing of the leads etc. are identical with the previous embodiment.

After reaching the required electrical value the assembly is gripped by jaw 46 and severed by cutter 64. The various cut off lengths extending between the coil and the cutter are wound onto the core body, and after the free ends have been adhesively secured the core is released and the finished condenser drops out of the machine.

In the fourth stage (FIG. 12) all of the guide rollers move out of the path of the strips, with the exception of guide rollers 47, on which the varying cut-off lengths of foils extending between from cutter 64 and roller 4 rest. The tiltable table 44 is again introduced beneath the strip ends and moved up into a horizontal position. Thus the ends of the strips are brought into the position already described with reference to FIG. 9, and the whole operation is repeated.

A third embodiment will serve to illustrate the production of condensers of small rated value. As discussed earlier, these condensers have such short armature foils that there is no room to position the soldering mechanism for the leads in the vicinity of the winding position. In this case the method described in the first embodiment is altered so that the soldering mechanism attaches the leads before hand somewhat further away from the winding position. The spacing of the leads from one another is made somewhat greater than the largest spacing actually required.

It is necessary to keep in mind in this embodiment that the ends of all of the leads must be the same distance from the end of the armature. For this reason the armature is provided with several leads beforehand and is fed a certain distance into the feed device where any excess length is cut off the end of the foil.

Figure 3:
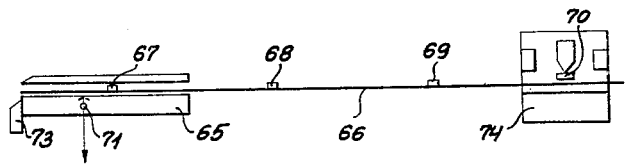
FIGS. 3 and 4 are diagrammatic side-elevational views illustrating successive steps in the winding of a condenser with one length of foil whereby the terminals are successively applied to a strip.
Figure 4:
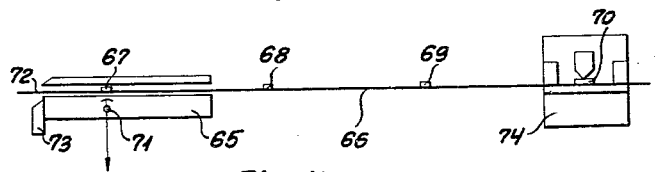

An embodiment of this method is shown in FIGURES 3 and 4. Instead of an armature feeding device 35 as used in FIGURE 5, a feed device 65 is used. Leads 67 to 70 are connected to a foil 66 in a soldering apparatus illustrated at 74 (FIG. 3). After being cut off the foils are fed forwardly until the next lead 68 reaches the contact 71. The protruding length 72 is then cut off by cutters 73 (FIG. 4). The other stages of the coil winding operation then follow as in the first embodiment.

Still a fourth embodiment of the invention serves to explain the production of condensers having extremely small rated values, where due to lack of space the above methods cannot be used. In this case the capacity of the machine itself should be about equal to the required size of the units. Thus a predetermined length of foil provided with a lead can be cut off from the continuous armature foil, fed into the vicinity of the winding position and guided into the winding coil whereafter the excess lengths are cut off.

An embodiment of this method is shown in FIGURES 13, 14, 15, 16 and 17.

The armature foil 75 is fed from a drum 76 into the soldering apparatus 77. There it is engaged by clamping jaws 78, 79 and provided with a lead 81 by the electrode 80 (FIG. 13).

After completion of the soldering the jaws 78, 79 open and a new set of jaws 82, 83 pulls the end of the foil toward and out of the soldering apparatus by a predetermined distance (FIG. 14).

Jaws 82, 84 and 85 are provided with cutter blades 86, 87, 88. The foil drawn out is gripped by the two jaws 84, 85, returning from the working position (FIG. 15) which close, and the blade 86 cooperates with the edge of jaw 85 and the two blades 87, 88 to sever the section 89 from the continuous strip (FIG. 16).

The two jaws 82, 83 now move horizontally toward the drum 76 into the position shown in FIGURE 17 and the jaws 84, 85 simultaneously move into the working position. The severed ends of the supply foil are gripped by the jaws 82, 83 (FIG. 17).

In the working position the jaw 84 slides up to the end of the jaw 85 pushing the end of the cut-off strip 89 into the coil with the aid of a co-operating rubber pad 97. The winding operation then pulls the remainder of the foil from between the loosely gripping jaws 84, 85 (FIG. 14). After the required length of foil is reached the cutter 90 severs the strip. Jaws 84, 85 then open and return to their position shown in FIGURE 15 and the operation is repeated. The remaining fragments of foil 91, 92 resulting from the two cutting operations are removed from the surface of the jaws by brushes 93, 94, 95, 96 and thus cause no damage.

It will be apparent that the controls of the pairs of jaws 82, 83, and 84, 85 are arranged at different sides of the apparatus.

I claim:

1. A method of winding condensers, comprising the steps of:
    (a) providing a stack of elongated dielectric strips and at least one elongated conductor strip disposed thereamongst for winding about a core;
    (b) gripping said stack at a location spaced from said core;
    (c) forming loops in at least some of said strips into linearly spaced positions forwardly of said gripping location;
    (d) cutting said stack between said positions, thereby producing free ends of said strips;
    (e) smoothing said free ends of said strips by extending them substantially linearly whereby said ends are simultaneously disposed in staggered positions; and
    (f) securing said free ends to a core disposed transversely of the direction of elongation of said strips and thereafter winding at least a portion of said strips about said core.

2. A method of winding condensers as defined in claim 1, further comprising the step of providing said conductor strips with connecting leads prior to the disposition of said conductor strip among said dielectric strips.

3. A method of winding condensers as defined in claim 2, further comprising the step of cutting said conductor strip with said attached leads into portions of a predetermined length.

4. A method of winding condensers as defined in claim 1, further comprising the step of disposing said free ends substantially horizontally, rolling said core along said strips thereby securing said free ends to said core, and thereafter winding at least a portion of said strips about said core.

5. A method of winding condensers, comprising the steps of:
    (a) drawing from a supply a plurality of narrow dielectric ribbons and a first narrow electrically conductive ribbon;
    (b) juxtaposing said ribbons with said conductive ribbon disposed between a pair of said dielectric ribbons to form a stack;
    (c) gripping said stack of ribbons at a location rearwardly of the free ends thereof and advancing said ribbons toward an axis transverse of the direction of elongation of said ribbons;
    (d) seizing said ribbons at said ends for rotary entrainment about said axis;
    (e) releasing said ribbons at said location;
    (f) deflecting said ribbons along divergent paths at a first position rearwardly of said axis and at a second position spaced from said first position for forming respective loops of predetermined lengths in said ribbons at both of said positions;
    (g) rotating said ends about said axis for forming a wound coil;
    (h) advancing during said rotation the free end of a second electrically conductive ribbon for common entrainment with the other ribbons;
    (i) gripping said dielectric ribbons and said first conductive ribbon at a location rearwardly of said loops upon reaching a predetermined electrical value of said wound coil, cutting through said ribbons at a point between said location and said loops, and cutting through said second conductive ribbon at another point rearwardly of said axis;
    (j) rotating said coil about said axis for a relatively large number of revolutions until the terminal portions of said ribbons are wound on said coil; and
    (k) securing said terminal portions to said coil.

6. A method of winding condensers, comprising the steps of:
    (a) drawing from a supply a plurality of narrow dielectric ribbons and a first narrow electrically conductive ribbon;
    (b) juxtaposing said ribbons with said conductive ribbon disposed between a pair of said dielectric ribbons to form a stack;
    (c) gripping said stack of ribbons at a location rearwardly of the free ends thereof; and linearly advancing said ribbons toward an axis transverse of the direction of elongation of said ribbons;
    (d) seizing said ribbons at said ends for rotary entrainment about said axis;
    (e) releasing said ribbons at said location;
    (f) deflecting said ribbons along divergent paths at a first position rearwardly of said axis and at a second position spaced from said first position for forming respective loops of predetermined lengths in said ribbons at both of said positions;
    (g) rotating said ends about said axis for forming a wound coil;
    (h) upon completion of a relatively small number of revolutions linearly advancing during said rotation the free end of a second electrically conductive ribbon for common entrainment with the other ribbons;
    (i) gripping said dielectric ribbons and said first conductive ribbon at a location rearwardly of said loops upon reaching a predetermined electrical value of said wound coil, cutting through said ribbons at a point between said location and said loops, and cutting through said second conductive ribbon at another point rearwardly of said axis;
    (j) rotating said coil about said axis for a relatively large number of revolutions until the terminal portions of said ribbons are wound on said coil; and
    (k) securing said terminal portions to said coil at peripherally spaced positions thereabout.

7. A method of winding condensers, comprising the steps of:
    (a) drawing from a supply a plurality of narrow dielectric ribbons and a first narrow electrically conductive ribbon;
    (b) juxtaposing said ribbons with said conductive ribbon disposed between a pair of said dielectric ribbons to form a stack;
    (c) aligning the free ends of said dielectric ribbons and positioning the free end of said conductive ribbon a predetermined distance inwardly thereof;
    (d) gripping said stack of ribbons at two locations adjacent one another along said ribbons rearwardly of said ends, separating said locations by a preset distance while retaining said grip for smoothing said ribbons; and linearly advancing said ribbons toward an axis transverse of the direction of elongation of said ribbons;
    (e) seizing said ribbons at said ends for rotary entrainment about said axis;
    (f) releasing said ribbons at said locations;
    (g) deflecting said ribbons along divergent paths at a first position rearwardly of said axis and at a second position spaced from said first position for forming respective loops of predetermined lengths in said ribbons at both of said positions;
    (h) rotating said ends about said axis for forming a wound coil;

(i) upon completion of a relatively small number of revolutions linearly advancing during said rotation the free end of a second electrically conductive ribbon for common entrainment with the other ribbons;

(j) gripping said dielectric ribbons and said first conductive ribbon at a location rearwardly of said loops upon reaching a predetermined electrical value of said wound coil, cutting through said ribbons at a point between said location and said loops, and cutting through said second conductive ribbon at another point rearwardly of said axis;

(k) rotating said coil about said axis for a relatively large number of revolutions until the terminal portions of said ribbons are wound on said coil; and (l) securing said terminal portions to said coil at peripherally spaced positions thereabout.

8. A method of winding condensers, comprising the steps of:

(a) drawing from a supply a plurality of narrow dielectric ribbons and two narrow electrically conductive ribbons;

(b) superposing said ribbons with said conductive ribbons disposed between respective adjacent pairs of dielectric ribbons;

(c) disposing the superposed free ends of said ribbons at spaced locations progressively further inward of an outermost end;

(d) applying an adhesive to a core body, pressing said core body to said ribbons near the outermost ends thereof, and rolling said core body along said ribbons from a first location to a second one longitudinally spaced therefrom, thereby rotationally entraining a portion of said ribbons and forming a wound coil;

(e) linearly displacing said coil from said second to said first location, thereby drawing said ribbons along;

(f) deflecting said ribbons along paths of differing predetermined lengths at a first location and a second location spaced therefrom and both situated rearwardly of said axis;

(g) gripping said ribbons at a third location rearwardly removed from said second location upon reaching a predetermined electrical value of said wound coil, and cutting through said ribbons at a point situated between said first and said second location;

(h) continuing to rotate said coil about said axis for a relatively large number of revolutions until the terminal portions of said ribbons are wound on said coil; and (i) applying adhesive to said terminal portions for securing the same to said coil at peripherally spaced locations thereabout.

References Cited in the file of this patent
UNITED STATES PATENTS

| | | |
|---|---|---|
| 1,940,847 | Danziger | Dec. 26, 1933 |
| 2,416,540 | Nordberg | Feb. 25, 1947 |
| 2,416,989 | Gauthier | Mar. 4, 1947 |
| 2,533,716 | Coursey | Dec. 12, 1950 |
| 2,542,806 | Ford et al. | Feb. 20, 1951 |
| 2,710,441 | Heyman | June 14, 1955 |
| 3,001,734 | Wellington | Sept. 26, 1961 |
| 3,018,064 | Dubilier | Jan. 23, 1962 |